United States Patent Office 3,759,904
Patented Sept. 18, 1973

3,759,904
7-[D-(α-AMINO-α-PHENYL-, 2-THIENYL- AND 3-THIENYLACETAMIDO)]-3 - [S-(1,2,3-TRIAZOLE-5-YL)THIOMETHYL]-3 - CEPHEM - 4-CARBOXYLIC ACIDS AND SALTS THEREOF
Leonard Bruce Crast, Jr., Clay, N.Y., assignor to Bristol-Myers Company, New York, N.Y.
No Drawing. Continuation-in-part of abandoned application Ser. No. 107,448, Jan. 18, 1971. This application July 29, 1971, Ser. No. 167,534
Int. Cl. C07d 99/24
U.S. Cl. 260—243 C
24 Claims

ABSTRACT OF THE DISCLOSURE

7-[D-(α-amino-α-phenyl-, 2-thienyl- and 3-thienyl-acetamido)] - 3 - [S - (1,2,3 - triazole - 5 - yl)thiomethyl]-3-cephem-4-carboxylic acids and their nontoxic, pharmaceutically acceptable salts are valuable as antibacterial agents, as nutritional supplements in animal feeds, as agents for the treatment of mastitus in cattle and as therapeutic agents in poultry and animals, including man, and are especially useful in the treatment, particularly by oral administration, of infectious diseases caused by many Gram-positive and Gram-negative bacteria.

CROSS-REFERENCE TO RELATED APPLICATIONS

This application is a continuation-in-part of my prior, copending application Ser. No. 107,448 filed Jan. 18, 1971, and now abandoned.

BACKGROUND OF THE INVENTION (1) Field of the invention

The cephalosporins of the present invention possess the usual attributes of such compounds and are particularly useful in the treatment of bacterial infections by oral administration.

(2) Description of the prior art

Cephalothin and cephaloridine are well-known antibacterial agents; see U.S. Pats. 3,218,318; 3,449,338 and 3,498,979. The literature also contains considerable data on the activity of cephaloglycin and cephalexin; see U.S. Pats. 3,303,193 and 3,507,861 and Great Britain 985,747 and 1,054,806. Newer cephalosporins include cefazolin and cephapirin; see U.S. Pat. 3,516,997 [and also Netherlands 6805179 (Farmdoc 34,328) and South Africa 68/4,513] and U.S. Pat. 3,422,100.

The literature on cephalosporins has been reviewed by E. P. Abraham, Quart. Rev. (London), 21, 231 (1967) by E. Van Heyningen, Advan. Drug Res., 4, 1–70 (1967) and briefly in Annual Reports in Medicinal Chemistry, Academic Press, Inc., 111 5th Ave., New York, N.Y., 10003, by L. C. Cheney on pp. 96 and 97 (1967) and by K. Gerzon and R. B. Morin on pp. 90–93 (1968) and by Gerzon on pp. 79–80 (1969). New cephalosporins are frequently reported at the annual Interscience Conference on Antimicrobial Agents and Chemotherapy as illustrated by Sassiver et al., Antimicrobial Agents and Chemotherapy—1968, American Society for Microbiology, Bethesda, Md., pp. 101–114 (1969) and by Nishida et al., ibid, 236–243 (1970). Two excellent recent reviews are the Cephalosporins; Microbiological, Chemical and Pharmacological Properties and Use in Chemotherapy of Infection, L. Weinstein and K. Kaplan, Annals of Internal Medicine, 72, 729–739 (1970) and Structure Activity Relationships Among Semisynthetic Cephalosporins. M. L. Sassiver and A. Lewis, Advances in Applied Microbiology, edited by D. Perlman, 13 163–236 (1970), Academic Press, New York.

The preparation of various 7-[α-amino-arylacetamido]-cephalosporanic acids and the corresponding desacetoxy compounds in which aryl represents unsubstituted or substituted phenyl or 2- or 3-thienyl is described, for example, in British specifications 985,747, 1,017,624, 1,054,806 and 1,123,333, in Belgium Pat. 696,026 (Farmdoc No. 29,494), in U.S. Pats. 3,311,621, 3,352,858, 3,489,750, 3,489,751, 3,489,752 and 3,518,260, in Japanese Pat. 16,-871/66 (Farmdoc 23,231) by Spencer et al., J. Med. Chem., 9 (5), 746–750 (1966), by Ryan et al., J .Med. Chem., 12, 310,313 (1969) and by Kurita et al., J. Antibiotics (Tokyo) (A) 19, 243–249 (1966) and see also U.S. Pat. 3,485,819.

Netherlands Pats. 6811676 (Farmdoc 36,349) and 6812382 (Farmdoc 36,496) and U.S. Pats. 3,489,750 and 3,489,751 disclose ring-substituted cephaloglycins.

Various 7 - [α-amino-arylacetamido]cephalosporins in which one hydrogen of the α-amino group is replaced by a carbonyl group which is attached in turn to another moiety have been reported. The earliest were the cephaloglycin and cephalexin precursors in which use was made of a common peptide blocking group such as carbobenzyloxy as illustrated by U.S. Pat. 3,364,212, Belgian Pat. 675,298 (Farmdoc 22,206), South African Pat. 67/1,260 (Farmdoc 28,654) and Belgian Pat. 696,026 (Farmdoc 29,494). Related compounds include those of U.S. Pats. 3,303,193 and 3,311,621 and 3,518,260.

Various cephalosporins, including cephalosporin C on occasion but not cephaloglycin, have been reacted with nucleophilic, aromatic mercaptans to produce compounds having the structure

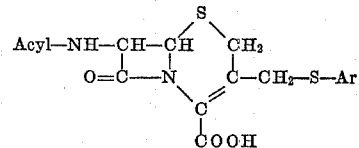

In U.S. Pat. 3,278,531 Ar is phenyl or certain substituted phenyls or certain aromatic heterocyclic rings named, for example, in col. 5. Similar nucleophiles, e.g. 2-mercaptopyrimidines, are disclosed in U.S. 3,261,832 and Great Britain 1,101,422 and U.S. 3,479,350 and U.S. 3,502,665, all issued to Glaxo. A parallel disclosure is found in Great Britain 1,109,525 to Ciba, e.g. in definition "h" for R₃. Additional nucleophiles of this type were disclosed by Fujisawa in Belgium 714,518 (Farmdoc 35,307; Netherlands 6806129 and South Africa 68/2,695), in Canada 818,501 (Farmdoc 38,845), in Great Britain 1,187,323 (Farmdoc 31,936; Netherlands 6714888) in U.S. 3,530,-123 and U.S. 3,516,997 (Farmdoc 34,328; Netherlands 6805179) which includes the compound named cefazolin, which has a tetrazolylacetyl side chain on the 7-amino group and a 5-methyl-thiadiazolylthiomethyl group at the 3-position and is described at some length in the scientific literature, e.g. in Antimicrobial Agents and Chemotherapy—1969, American Society for Microbiology, Bethesda, Md. at pp. 236-243 and in J. Antibiotics (Japan), 23 (3), 131–148 (1970).

More recently, replacement of the 3-acetoxy group of a cephalosporin by various heterocyclic thiols has been disclosed in U.S. 3,563,983 and in Netherlands 7005519 (Farmdoc 80,188R) where the side chains were, for example 7-α-aminophenylacetamido and typical heterocyclic thiols were 2-methyl-1,3,4-thiadiazole-5- thiol and 1-methyl-1,2,3,4-tetrazole-5-thiol; the latter corresponds to U.S. Pat. 3,641,021 issued Feb. 8, 1972 on an application filed Apr. 18, 1969.

Various cephalosporins having the structure

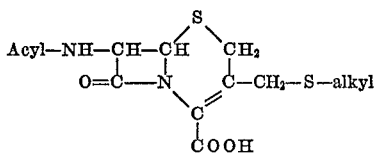

in which acyl represents various side chains including α-aminophenylacetyl have been described in some of the above and by Glaxo in Belgium Pat. 734,532 (Farmdoc 41,619) and in Belgium Pat. 734,533 (Farmdoc 41,620).

Cephalosporins having the structure

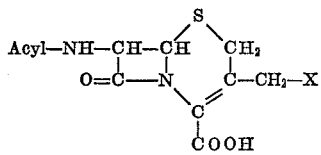

where X includes

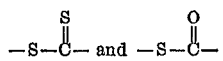

are disclosed in some of the above and in U.S. Pats. 3,239,515, 3,239,516, 3,243,435, 3,258,461, 3,431,259 and 3,446,803.

Related publications in the scientific literature include J. Med. Chem., 8, 174–181 (1965) and J. Chem. Soc. (London), 1595–1605 (1965), 5015–5031 (1965) and 1959–1963 (1967).

SUMMARY OF THE INVENTION

This invention comprises the amphoteric compound of the formula

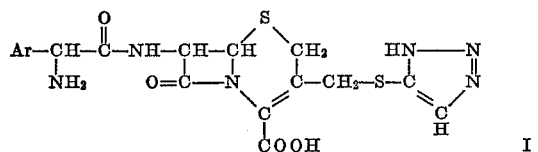

wherein Ar represents phenyl, 2-thienyl or 3-thienyl and having the D configuration and existing primarily as the zwitterion, and its nontoxic pharmaceutically acceptable salts.

Such salts include the nontoxic carboxylic acid salts thereof, including nontoxic metallic salts such as sodium, potassium, calcium and aluminum, the ammonium salt and substituted ammonium salts, e.g. salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis - dehydroabietylethylenediamine, N-(lower)alkylpiperidine, e.g., N-ethylpiperidine, and other amines which have been used to form salts with benzylpenicillin; and the nontoxic acid addition salts thereof (i.e., the amines salts) including the mineral acid addition salts such as hydrochloride, hydrobromide, hydroiodide, sulfate, sulfamate and phosphate and the organic acid addition salts such as the maleate, acetate, citrate, oxalate, succinate, benzoate, tartrate, fumarate, malate, mandelate, ascorbate and the like.

The amphoteric compound of the present invention is prepared according to the present invention by coupling with 7-amino-3-[S-(1,2,3-triazole-5-yl)-thiomethyl] - 3-cephem-4-carboxylic acid (II) (or a salt or easily hydrolyzed ester thereof including those of U.S. Pat. 3,284,-451 and any of the silyl esters described in U.S. Pat. 3,249,622 for use with 7-aminopenicillanic acid and used in Great Britain 1,073,530) a particular acid or its functional equivalent as an acylating agent for a primary amino group. After coupling, the blocking group is removed to give the desired product. Said acid has the formula

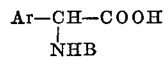

wherein Ar represents phenyl, 2-thienyl or 3-thienyl and wherein B represents a blocking group of the type used either in peptide syntheses or in any of the numerous synthesis of α-aminobenzylpenicillin from 2-phenylglycine. Particularly valuable blocking groups are a proton, as in the compound of the formula

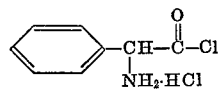

or a β-diketone as in Great Britain 1,123,333, e.g., methyl acetoacetate, in which case the acid containing the blocked amino group is preferably converted to a mixed anhydride, as with ethyl chloroformate, before reaction with compound II or a salt thereof to form the desired product I after acid cleavage.

Further to the discussion above of blocking groups used on the free amino group of the side chain acid during its coupling with compound II, the blocking group is then removed to form the products of the present invention, e.g., the t-butoxy-carbonyl group is removed by treatment with formic acid, the carbobenzyloxy group is removed by catalytic hydrogenation, the 2-hydroxy-1-naphthcarbonyl group is removed by acid hydrolysis and the trichloroethoxycarbonyl group by treatment with zinc dust in glacial acetic acid. Obviously other functionally equivalent blocking groups for an amino group can be used and such groups are considered within the scope of this invention.

Thus, with respect to said acid to be used to couple with Compound II, functional equivalents include the corresponding acid anhydrides, including mixed anhydrides and particularly the mixed anhydrides prepared from stronger acids such as the lower aliphatic monoesters of carbonic acid, or alkyl and aryl sulfonic acids and of more hindered acids such as diphenylacetic acid. In addition, an acid azide or an active ester or thioester (e.g., with p-nitrophenol, 2,4-dinitrophenol, thiophenol, thioacetic acid) may be used or the free acid itself may be coupled with Compound II after first reacting said free acid with N,N'-dimethyl-chloroformiminium chloride [cf. Great Britain 1,008,170 and Novak and Weichet, Experientia XXI, 6, 360 (1965)] or by the use of enzymes or of an N,N'-carbonyldiimidazole or an N,N'-carbonylditriazole [cf. South African patent specification 63/2,684] or a carbodiimide reagent [especially N,N'-dicyclohexylcarbodiimide, N,N'-diisopropylcarbodiimide or N-cyclohexyl-N'-(2-morpholinoethyl)carbodiimide; cf. Sheehan and Hess, J. Amer. Chem. Soc., 77, 1067 (1955)], or of alkylylamine reagent [cf. R. Buijle and H. G. Viehe, Angew. Chem. International, edition 3, 582 (1964)], or of a ketenimine reagent [cf. C. L. Stevens and M. E. Mond, J. Chem. Soc., 80 (4065)] or of an isoxazolium salt reagent [cf. R. B. Woodwar, R. A. Olofson and H. Mayer, J. Amer. Chem. Soc., 83, 1010 (1961)]. Another equivalent of the acid chloride is a corresponding azolide, i.e., an amide of the corresponding acid whose amide nitrogen is a member of an quasiaromatic five membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolide. The by-product, imidazole, precipitates and may be separated and the imidazolide isolated, but this is not essential. The methods for carrying out these reactions to produce a cephalosporin and the methods used to isolate the cephalosporin so produced are well known in the art.

In the treatment of bacterial infections in man, the compounds of this invention are administered orally or parenterally, in accordance with conventional procedures for antibiotic administration, in an amount of from about 5 to 200 mg./kg./day and preferably about 5 to 20 mg./kg./day in divided dosage, e.g., three to four times a day. They are administered in dosage units containing, for example, 125 or 250 or 500 mg. of active ingredient with suitable physiologically acceptable carriers or excipients. The dosage units are in the form of liquid preparations such as solutions or suspensions or as solids in tablets or capsules.

Exactly 200 g. of 7-aminocephalosporanic acid (7-ACA) was suspended in 500 ml. of acetone and a solution of 240 g. of p-toluenesulfonic acid in 500 ml. of acetone was added in one charge. After stirring for five minutes, at room temperature, the mixture was filtered through diatomaceous earth ("Super Cel") and the bed washed with 150 ml. of acetone (the insoluble matter weighed about 30 g.). Then 80 ml. of water was added to the filtrate and, while stirring, the p-toluene-sulfonate salt crystallized out after scratching on the inside of the flask with a glass rod. The suspension was stirred in an ice-salt bath for thirty minutes and filtered cold. It was washed with 2× 200 ml. of cold acetone (0° C.) and air dried; yield 250 g. of salt. This p-toluene-sulfonate salt of 7-ACA was stirred in 2 liters of methanol and the insoluble matter filtered through "Super Cel." The filtrate was placed in a five liter 3 neck flask and 2 liters of water were added. Then the pH was adjusted to 4 by the addition of concentrated ammonium hydroxide with cooling and the suspension stirred for one hour at 0° C. The product was collected by filtration and washed with 2× 100 ml. $H_2O$ (0° C.) and 3× 1 liter acetone (room temperature). After air drying, the yield of 7-ACA was 145 g.

Reference: Glaxo, British Pat. 1,104,938 (1968).

The following examples are given in illustration of, but not in limitation of, the present invention. All temperatures are in degrees centigrade. 7-aminocephalosporanic acid is abbreviated as 7-ACA and methyl isobutyl ketone as MIBK. "Skellysolve B" is a petroleum ether fraction of B.P. 60–68° C. consisting essentially of n-hexane.

DESCRIPTION OF THE PREFERRED EMBODIMENTS

Example 1

Sodium D-α-[1-carbomethoxypropen-2-yl)-amino]phenyl-acetate.—Lit. ref. E. Dane, F. Oreis, P. Konrad, T. Dockner, Angew. Chem. Intern. Ed. Engl., 1, 658 (1962); E. Dane and T. Dockner Angew. Chem., 76, 342 (1964); Spencer, Flynn, Roeske, Sin and Chauvette, J. Med. Chem., 9, 746–50 (1966); U.S. Pat. 3,496,171 (Lilly).

To a well stirred mixture of 40 g. (1 mole) of NaOH in 40 ml. of $H_2O$ and one liter of benzene was added 151.6 (1 mole) of D-(—)-phenylglycine. The mixture was held at about 55° C. for 30 minutes and then with vigorous stirring 116 g. (1 mole) of methyl acetoacetate was added and the mixture stirred and heated at reflux until no more water was collected in the Dean Stark trap. Next one liter of acetone was added with the heat removed and then the slurry was cooled and stirred 30 minutes in an ice-salt bath. The product was collected by filtration, washed well with copious amounts of acetone and air dried. Yield was 191 g., dec. pt. 252° C., $[\alpha]_D^{22°C.}$ +207° (C.=1% $H_2O$).

Synthesis of potassium 1,2,3-triazole-5-thiolate

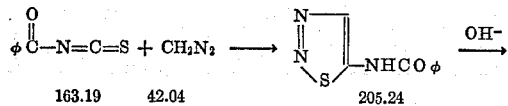

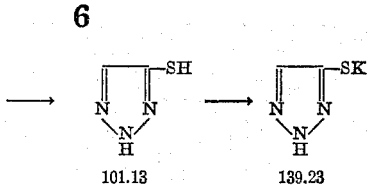

The synthesis of the thiol was accomplished by a procedure essentially identical to that described in the literature [J. Goerdler and G. Gnad, Chem. Ber. 99, 1618 (1966)].

5-benzamido-1,2,3-thiadiazole.—To a stirred solution of benzoylisothiocyanate (50.6 g., 310 mmoles) in commercial anhydrous ether (400 ml.), maintained at 0° and in a nitrogen atmosphere, was added dropwise with vigorous stirring, 0.685 N ethereal diazomethane (453 ml., 310 mmoles). When the addition was completed, the mixture was stirred for 1 hour at 0°, the solid was collected by filtration and dried in vacuo. The melting point of the crude material (23.3 g.) thus obtained was observed somewhere in the region 232 to 257°. Goerdler reported M.P. 267° for the pure material. A small second crop (2.1 g.) was obtained by evaporation of the mother liquor in vacuo. The total yield was therefore 40%.

1,2,3-triazole-5-thiol.—A solution of the above benzamido compound (8.2 g., 40 mmoles) in 2 N sodium hydroxide (80 ml., 160 mmoles) was heated under reflux temperature in a nitrogen atmosphere for 24 hours. The solution was cooled to 0° in ice, and concentrated hydrochloric acid (26 ml.) was added, while a continuous stream of nitrogen was passed through the solution. The benzoic acid which precipitated was collected by filtration; the filtrate was saturated with sodium chloride and the additional benzoic acid which separated was removed by filtration. The filtrate was immediately extracted with ethyl acetate, the extract was washed with saturated salt solution, dried over magnesium sulfate and then evaporated in vacuo. The viscous oil which remained was immediately evaporatively distilled in vacuo (70–75°/0.001 mm.) to give an oil (2.84 g., 70%) which solidified (M.P. 52–59°; Goerdler reported M.P. 60°) spontaneously.

Potassium 1,2,3-triazole-5-thiolate.—To a solution of the above thiol (2.84 g., 28.1 mmoles) in absolute ethanol (28 ml.) was added 1.93 N alcoholic potassium hydroxide solution (14.5 ml.). The solution was then diluted with anhydrous ether until crystallization of the salt was completed. The solid was collected by filtration, washed with ether, and dried in vacuo. The salt obtained in this manner (3.65 g., 93%) had M.P. 225° with decomposition.

7-amino - 3 - [S-(1,2,3 - triazole-5-yl)-thiomethyl]-3-cephem-4-carboxylic acid (II).—Ten grams (0.075 mole) of 5-mercapto-1,2,3-triazole potassium salt was added to a stirred slurry of 19 g. (0.07 mole) of purified 7-aminocephalosporanic acid and 5.9 g. (0.07 mole) of $NaHCO_3$ in 350 ml. of 0.1 M phosphate buffer (pH 6.4) and the mixture heated and stirred at 55° C. for 3½ hours under a nitrogen atmosphere. The resulting solution was cooled to 22° C. and the pH adjusted to 5.5 with 40% $H_3PO_4$. The resulting precipitate was filtered off, washed with cold water (50 ml.) and air dried. The yield of 7-amino-3-[S-(1,2,3-triazole - 5 - yl)-thiomethyl]-3-cephem-4-carboxylic acid was 8 g., dec. pt. 230° C. IR analysis showed some decomposition of the β-lactam ring but it was used "as is" for the next step.

Analysis.—Calcd. for $C_{10}H_{11}N_5O_3S_2$ (percent): C, 38.39; H, 3.54. Found (percent): C, 38.36; H, 3.78.

7-[D-α-amino-α-phenylacetamido] - 3 - [S - (1,2,3-triazole-5-yl)-thiomethyl]-3-cephem-4-carboxylic acid (I).—To a stirred suspension of 5.42 g. (0.02 mole) of sodium D-α-[1-carbomethoxypropen-2-yl)-amino]-phenyl acetate in 50 ml. of acetonitrile was added 2 drops of N,N-dimethylbenzylamine and the slurry cooled and stirred at —10° C. while 2.14 g. (0.02 mole) of ethyl chloroformate was added. After 20 min. at —10° C., a solution of 6.26 g. (0.02 mole) of 7-amino-3-[S-(1,2,3-triazole-5-yl)thiomethyl]-3-cephem-4-carboxylic acid, 2.8 ml. (0.02 mole) of triethylamine, 40 ml. of acetonitrile, and 40 ml. of water precooled to 0° C. was added, all at once, with vigorous stirring. After 45 min. at 0° C. the solution was saturated with salt (excess NaCl) for 15 min. The organic (top) layer was separated and to it there was added 40 ml. of water and the resulting solution concentrated, in vacuo, at 20° C. to a volume of about 50 ml. To this solution was added a solution of 70 ml. of methyl isobutyl ketone (MIBK) and 8 ml. of 90% formic acid. The mixture was first shaken and then stirred at 0° C. for 3 hours. The aqueous phase was then separated and then stirred 30 min. with a fresh 70 ml. portion of MIBK at 0° C. and separated again. The aqueous phase was then concentrated to near dryness at <20° C. under reduced pressure. The residual oil was then triturated with acetonitrile until solid. The solids were collected by filtration, air dried, and then vacuum dried over $P_2O_5$ for 14 hours. The yield was 2.45 g. of 7 - [D-α-amino-α-phenylacetamido]-3-[S-(1,2,3-triazole-5-yl)thiomethyl]-3-cephem-4-carboxylic acid. This material by IR showed evidence of phenylglycine and starting II above in it as impurities. These were removed by dissolving the material in 25 ml. of water, filtering, adjusting the pH to 1.5 with 40% $H_3PO_4$, adding 1 g. of "Darko KB" decolorizing carbon, stirring 10 min., filtering through diatomaceous earth ("Dicalite") filter aid and adjusting the pH to 3.5 with solid $NaHCO_3$. Next, the clear white solution was concentrated to a volume of about 15 m. and the white precipitate collected by filtration, air dried and then vacuum dried over $P_2O_5$. The amorphous, water soluble product, 7[D-α-amino-α-phenylacetamido]-3-[S-(1,2,3-triazole - 5 - yl)-thiomethyl]-3-cephem-4-carboxylic acid, which weighed 500 mg., gave a completely consistent IR and NMR spectra and showed no evidence of any significant contamination. Elemental analysis showed 6.15% water by the Karl Fischer method and 1.61% sodium as residue.

It is important to note that the conversion of the benzamido thiadiazole to the triazole thiol is known to proceed via 5-amino-1,2,3-thiadiazole [G. Goerdler and G. Gnad, Chem. Ber., 99, 1618 (1966)].

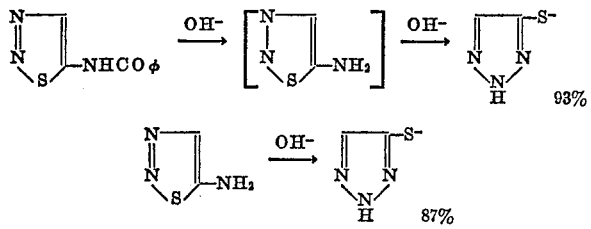

5-amino-1,2,3-thiadiazole can be prepared by an alternative route, not involving diazomethane [D. L. Pain and R. Slack, J. Chem. Soc., 5166 (1965)].

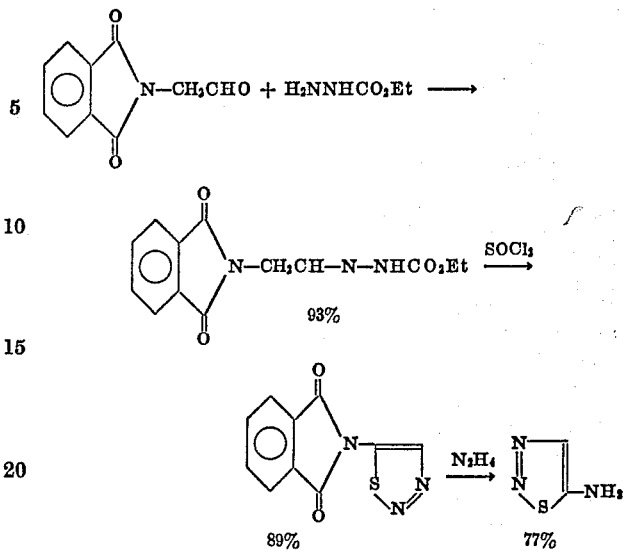

This sample of 7-[D-(α-amino-α-phenylacetamido)]-3-[S - (1,2,3-triazole-5-yl)-thiomethyl] - 3 - cephem-4-carboxylic acid (called new compound) after solution in water at 2 mgm./ml. followed by dilution with nutrient broth was found to exhibit the following minimum inhibitory concentrations (M.I.C.) in mcg./ml. versus the indicated microorganisms as determined by overnight incubation at 37° C. by tube dilution. Results with two old, orally absorbed cephalosporins are also given.

TABLE 1.—M.I.C. in mcg./ml.

| Organism | | New compound | Cephalexin | Cephaloglycin |
|---|---|---|---|---|
| D. pneumoniae plus 5% serum [1] | A9585 | 0.08 | 0.16 | 0.04 |
| Str. pyogenes plus 5% serum [1] | A9604 | 0.04 | 0.16 | 0.04 |
| S. aureus Smith | A9537 | 0.3 | 0.6 | 0.6 |
| S. aureus Smith plus 50% serum. | A9537 | 0.25 | 1.3 | 1.3 |
| S. aureus BX1633-2 at $10^{-3}$ dil'n. | A9606 | 0.6 | 2 | 1.3 |
| S. aureus BX1633-2 at $10^{-2}$ dil'n. | A9606 | 1 | 4 | 2.5 |
| S. aureus meth.-resistant | A15097 | ≤2 | 32 | 4 |
| Sal. enteritidis | A9531 | ≤0.25 | 2 | 0.3 |
| E. coli Juhl | A15119 | 0.5 | 8 | 1 |
| E. coli | A9675 | 2 | 16 | 4 |
| K. pneumoniae | A9977 | ≤0.2 | 8 | 0.6 |
| Do | A15130 | 1 | 16 | 1 |
| Pr. mirabilis | A9900 | ≤0.2 | 8 | 0.6 |
| Pr. morganii | A15153 | 16 | >125 | 63 |
| P. aeruginosa | A9843A | >125 | >125 | >125 |
| Ser. marcescens | A20019 | 125 | >125 | >125 |

[1] 50% nutrient broth plus 45% antibiotic assay broth.

Blood levels in the mouse after oral administration were determined with the following results:

| | Dose, mgm./kg. | Blood level in, mcg./ml. Hours after administration— | | | |
|---|---|---|---|---|---|
| | | 0.5 | 1 | 2 | 3.5 |
| (new compound) | 100 | 6.6 | | | |
| | 100 | 4.1 | 5.74 | 2.8 | 2.1 |
| (cephalexin)-monohydrate | 100 | 49.9 | | | |
| | 100 | 33.2 | 18 | 5 | 1.73 |

Example 2

Sodium 7-[D - (α - amino-α-phenylacetamido]-3-[S-(1,2,3 - triazole-5-yl)-thiomethyl]3-cephem-4-carboxylate.—To a stirred aqueous suspension of the zwitterionic form of 7 - [D-(α-amino-α-phenylacetamido)]-3-[S-(1,2,3-triazole-5-yl)-methyl]-3-cephem - 4 - carboxylic acid (0.8 mmole) is added 1 N aqueous sodium hydroxide at room temperature until a clear solution (pH 10.8) is obtained. This solution is immediately freeze-dried to give impure, solid sodium 7-[D-(α-amino-α-phenylacetamido)]-3-[S-(1,2,3-triazol-5-yl)-thiomethyl]-3-cephem-3-carboxylate.

Example 3

7 - [D - (—)-α-amino-α-(3-thienyl)-acetamido]-3-[S-(1,2,3 - triazole - 5-yl)-thiomethyl]-3-cephem-4-carboxylic acid.—To a stirred suspension of 16 g. (0.05 mole) of 7-amino - 3 - [S-(1,2,3-triazole-5-yl)thiomethyl]-3-cephem-4-carboxylic acid, in 150 ml. of methylene chloride was added 13.5 ml. (0.092 mole) of triethylamine, 15 ml. (0.118 mole) of N,N-dimethylaniline and, with cooling (7° C. to 15° C.), 19.1 ml. (0.15 mole) of trimethylchlorosilane. After 15 min. cooling, the mixture was refluxed for 25 min., cooled to 5° C. and 13 g. (0.061 mole) of D - (—)-α-amino-α-(3-thienyl)-acetylchloride hydrochloride added. The mixture was stirred at 10° C. to 12° C. for 1 hour and then 150 ml. of water was added and, after 15 min. stirring, the mixture was filtered, the aq. phase separated, the pH adjusted to 2 with 20% NaOH, carbon (10 g. of "Darco KB") added and, after 15 min. stirring, the mixture was filtered. The pale yellow solution was layered with ether (150 ml.) and, with good stirring, the pH was adjusted to 4 with 20% NaOH. The aq. phase was separated and filtered and 50 ml. of acetonitrile added to it. Scratching or seeding induced crystallization and gave 4.5 g. of water washed and vacuum dried 7-[D-(—)-α - amino-α-(3-thienyl)-acetamido]-3-[S-(1,2,3-triazole-5-yl) - thiomethyl] - 3-cephem-4-carboxylic acid; dec. pt. >150° C. (indefinite). The IR and NMR were consistent for the desired structure.

*Analysis.*—Calcd. for $C_{16}H_{16}N_6O_4S_3 \cdot H_2O$ (percent): C, 40.88; H, 3.86; N, 17.87. Found (percent): C, 40.21; H, 3.87; N, 17.63.

Example 4

7 - [D - (—)-α-amino-α-(2-thienyl)-acetamido]-3-[S-(1,2,3 - triazole-5-yl)-thiomethyl]-3-cephem-4-carboxylic acid.—Following the exact same procedure as in Example 3 except using D-(—)-α-amino-α-(2-thienyl)-acetylchloride hydrochloride, gave 6.01 g.; dec. pt. >150° C. (indefinite). The IR and NMR spectra were consistent with the desired structure.

*Analysis.*—Calcd. for $C_{16}H_{16}N_6O_4S_3 \cdot H_2O$ (percent): C, 40.88; H, 3.86; N, 17.87; K.F. $H_2O$, 3.87. Found (percent): C, 39.60; H, 3.89; N, 16.90; K.F. $H_2O$, 5.43.

I claim:

1. The compound having the D configuration in the side chain of the formula

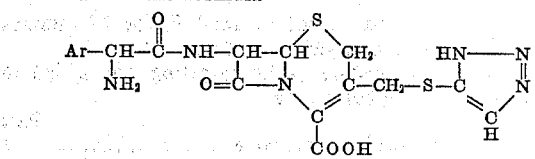

wherein Ar represents phenyl, 2-thienyl or 3-thienyl or a nontoxic, pharmaceutically acceptable salt thereof.

2. The compound having the D configuration in the side chain of the formula

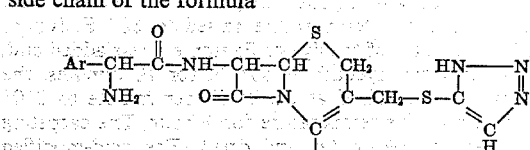

wherein Ar represents phenyl, 2-thienyl or 3-thienyl.

3. The sodium salt of the compound of claim 2.
4. The potassium salt of the compound of claim 2.
5. The zwitterion form of the compound of claim 2.
6. A nontoxic, pharmaceutically acceptable acid addition salt of the compound of claim 2.
7. The compound of claim 1 having the D configuration in the side chain of the formula

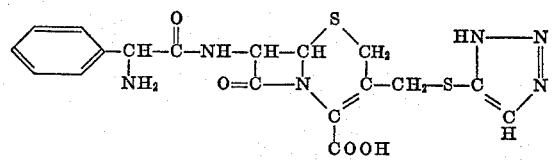

or a nontoxic, pharmaceutically acceptable salt thereof.

8. The compound of claim 2 having the D configuration in the side chain of the formula

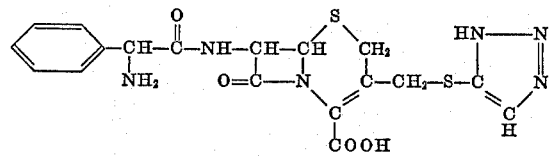

9. The sodium salt of the compound of claim 8.
10. The potassium salt of the compound of claim 8.
11. The zwitterion form of the compound of claim 8.
12. A nontoxic, pharmaceutically acceptable acid addition salt of the compound of claim 8.
13. The compound of claim 1 having the D configuration in the side chain of the formula

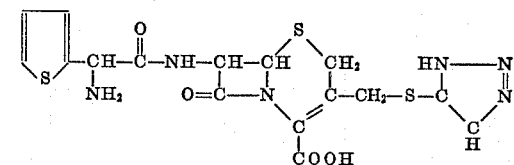

or a nontoxic, pharmaceutically acceptable salt thereof.

14. The compound of claim 2 having the D configuration in the side chain of the formula

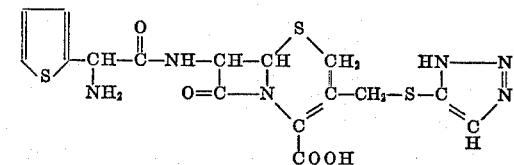

15. The sodium salt of the compound of claim 14.
16. The potassium salt of the compound of claim 14.
17. The zwitterion form of the compound of claim 14.
18. A nontoxic, pharmaceutically acceptable acid addition salt of the compound of claim 14.
19. The compound of claim 1 having the D configuration in the side chain of the formula

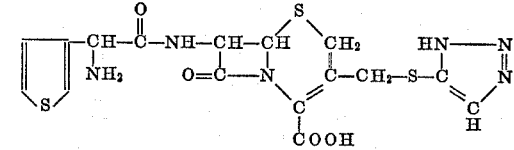

or a nontoxic, pharmaceutically acceptable salt thereof.

20. The compound of claim 2 having the D configuration in the side chain of the formula

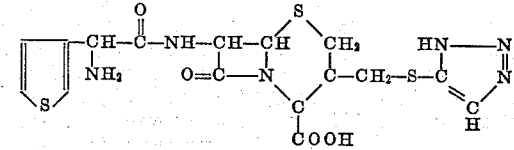

21. The sodium salt of the compound of claim 20.
22. The potassium salt of the compound of claim 20.
23. The zwitterion form of the compound of claim 20.

24. A nontoxic, pharmaceutically acceptable acid addition salt of the compound of claim 20.

References Cited

UNITED STATES PATENTS

| | | | |
|---|---|---|---|
| 3,641,021 | 2/1972 | Ryan | 260—239.1 |
| 3,516,997 | 6/1970 | Takano et al. | 260—239.1 |
| 3,352,858 | 11/1967 | Crast et al. | 260—243 C |
| 3,243,435 | 3/1966 | Couley et al. | 260—243 C |

NICHOLAS S. RIZZO, Primary Examiner

U.S. Cl. X.R.

424—246